United States Patent [19]

Diggs

[11] 4,011,989
[45] Mar. 15, 1977

[54] METAL BUILDING WITH INTEGRATED HOT WATER HEATING SYSTEM

[76] Inventor: Richard E. Diggs, 12A Road, Carthage, Mo. 64836

[22] Filed: Aug. 14, 1975

[21] Appl. No.: 604,663

[52] U.S. Cl. .................................. 237/59; 237/69; 237/61; 98/31; 165/56

[51] Int. Cl.² .......................................... F24D 3/00

[58] Field of Search ............ 98/31; 237/59, 61, 69, 237/1 A; 165/53, 56; 52/220, 262, 93

[56] References Cited

UNITED STATES PATENTS

| | | | |
|---|---|---|---|
| 904,215 | 11/1908 | Obrebowicz | 237/61 |
| 2,240,951 | 5/1941 | Hamjy | 98/31 |
| 2,425,775 | 8/1947 | Yarorough | 237/69 |
| 2,621,027 | 12/1952 | Tatsch | 98/31 |
| 2,660,409 | 11/1953 | Pittenger, Jr. et al. | 237/69 |
| 2,784,945 | 3/1957 | Fodor | 237/69 |
| 2,878,651 | 3/1959 | Heinzelman | 165/56 |
| 3,162,278 | 12/1964 | Rasch | 52/93 |
| 3,415,024 | 12/1968 | Kotlarz | 98/31 |
| 3,771,273 | 11/1973 | Brodie | 52/220 |
| 3,893,271 | 7/1975 | Kotlarz | 52/220 |
| 3,905,548 | 9/1975 | Brodie | 98/31 |

FOREIGN PATENTS OR APPLICATIONS 221,508  11/1942  Switzerland .................. 237/69

*Primary Examiner*—William E. Wayner
*Assistant Examiner*—Henry C. Yuen
*Attorney, Agent, or Firm*—Shoemaker and Mattare

[57] ABSTRACT

A metal building with an integrated hot water heating system includes a heater for heating water, pipes connected between the heater and heating grids in the floor of the building and the structural columns and beams of the frame of the building for circulation of hot water through the frame and floor of the building to heat the building primarily with radiant energy, wherein a substantially uniform temperature is maintained throughout the building, and a savings of up to 70% in energy required to heat the building is realized.

34 Claims, 17 Drawing Figures

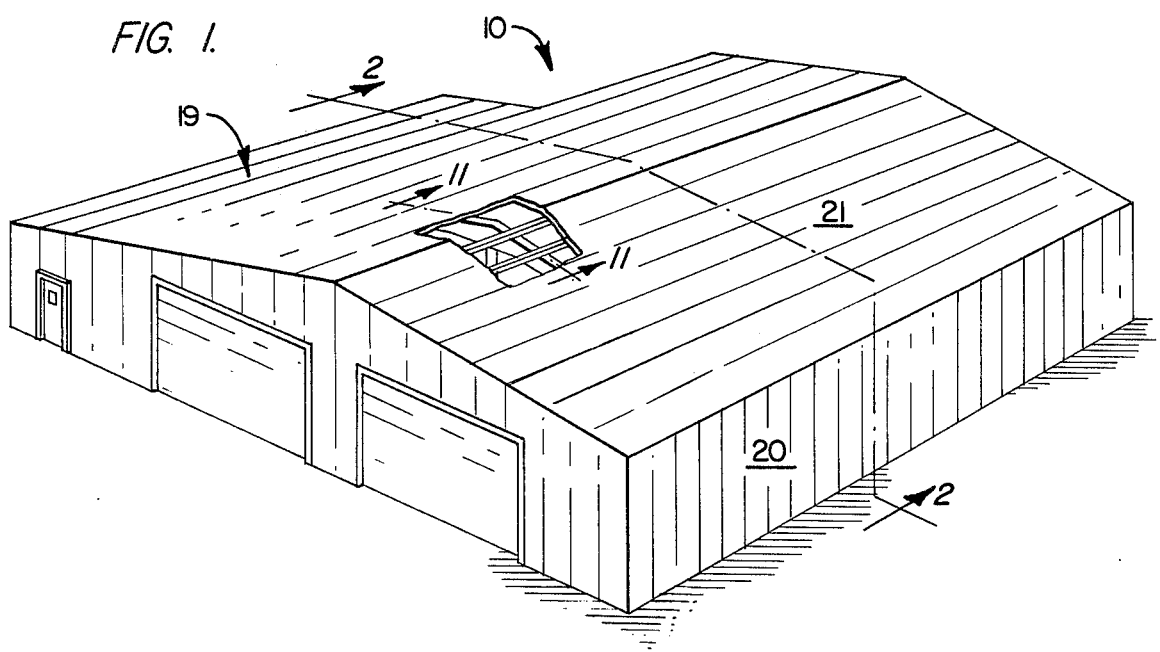
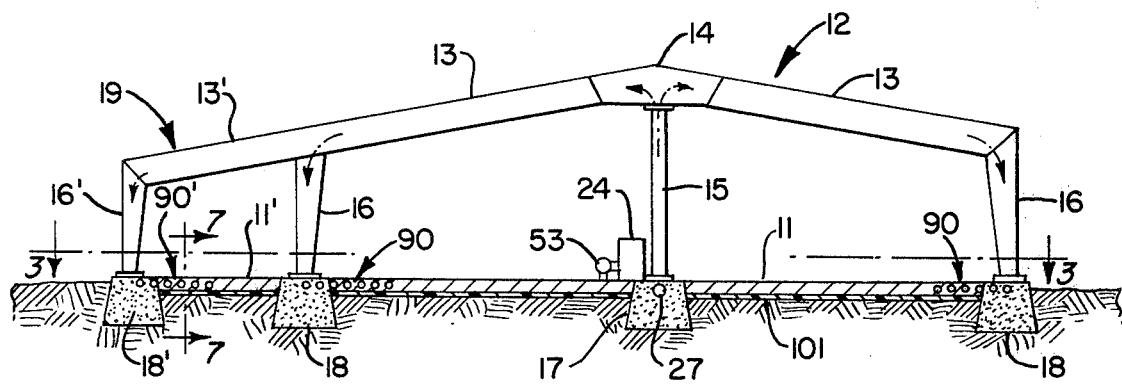
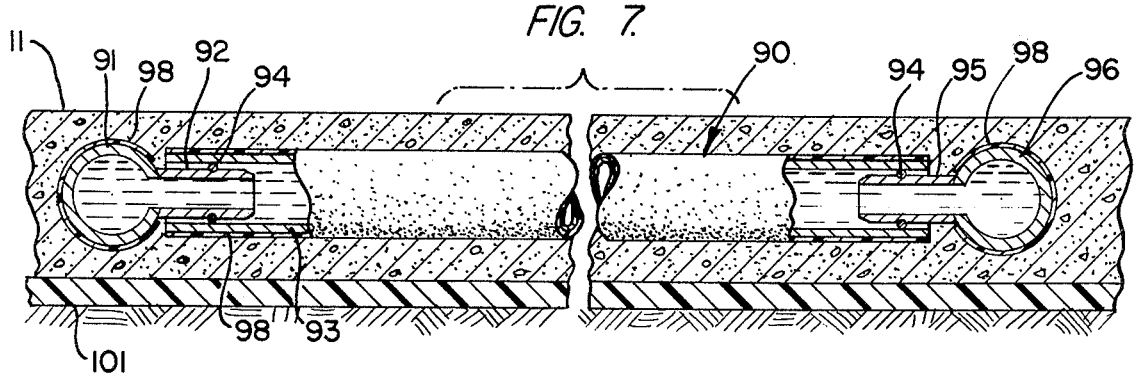

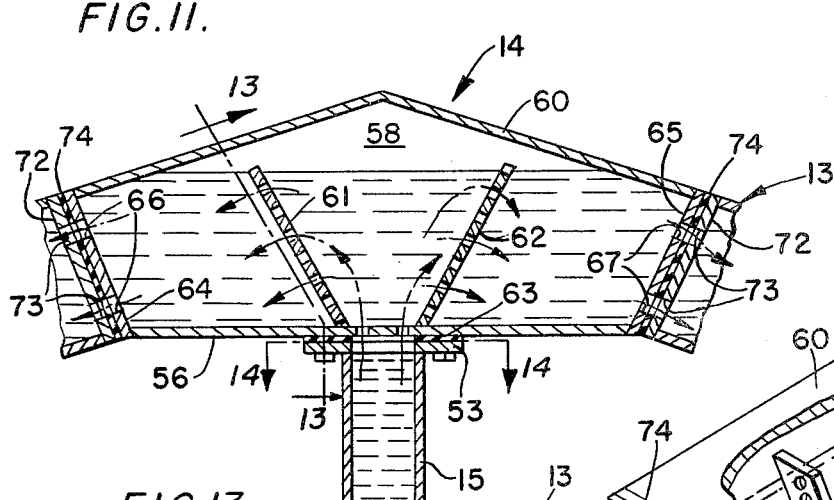
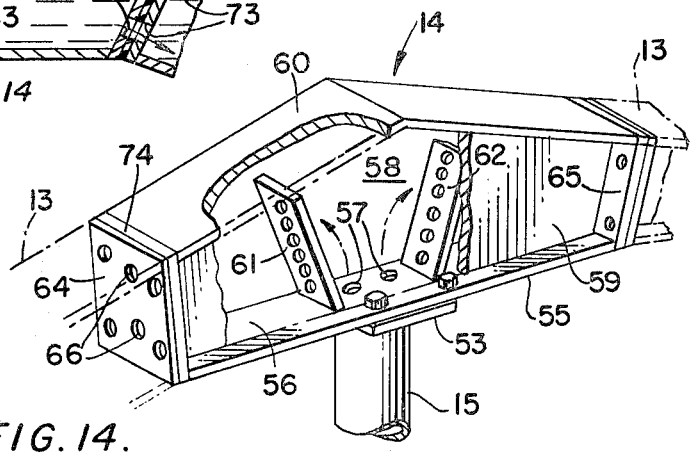
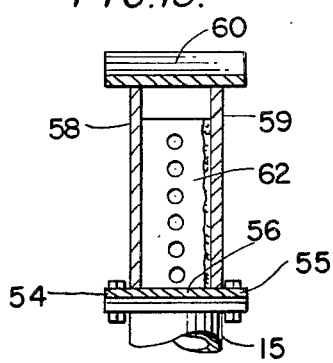
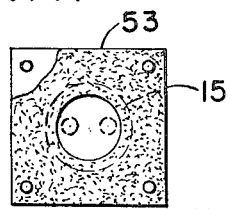
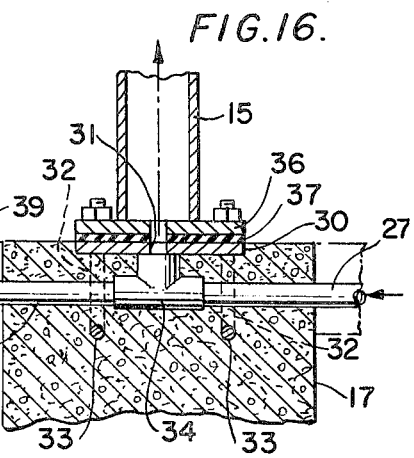
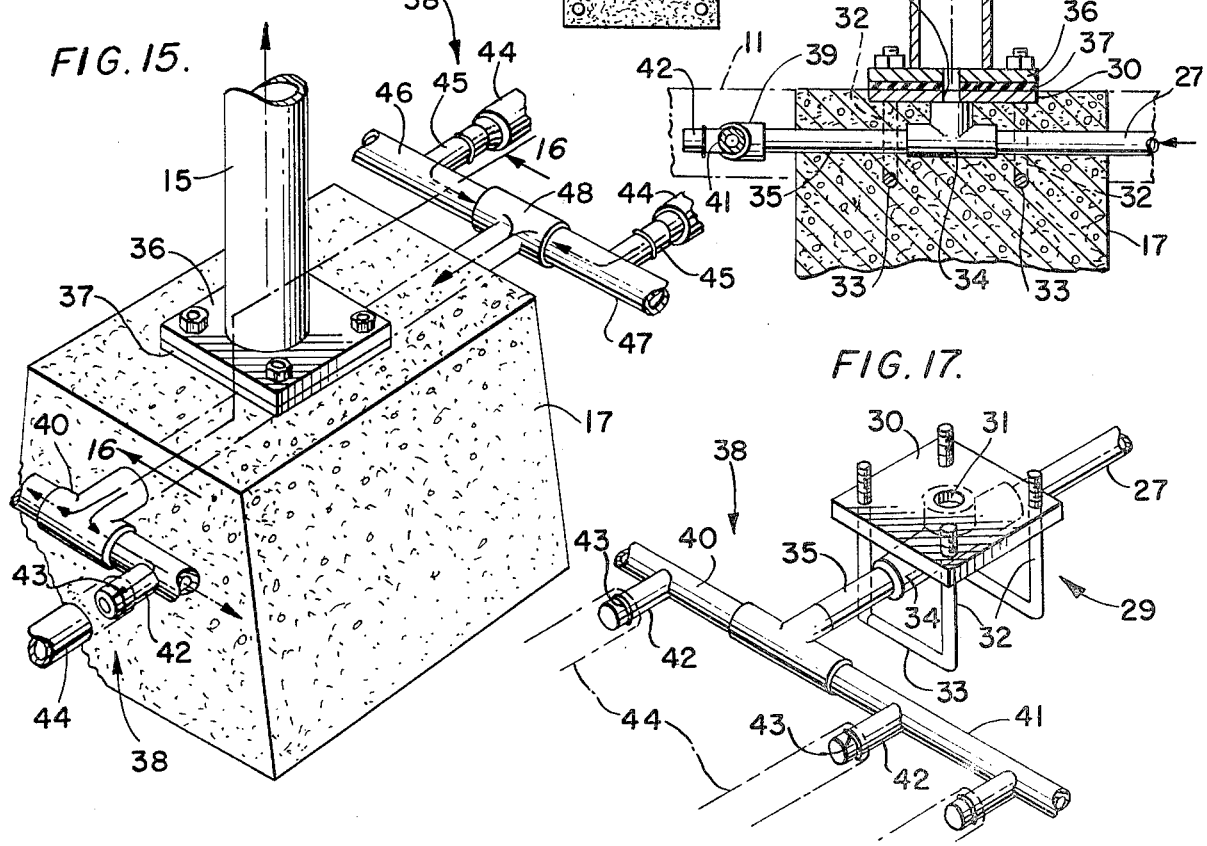
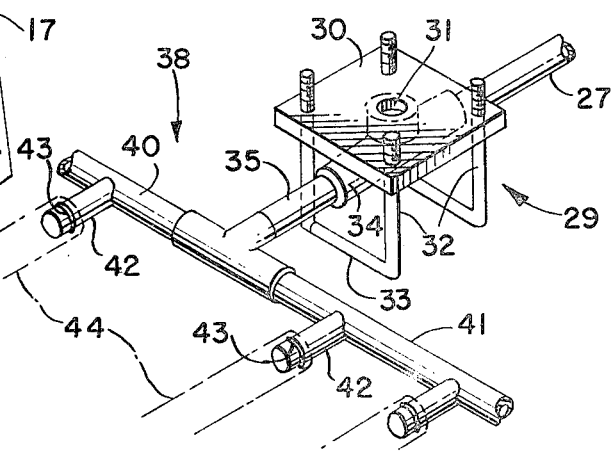

METAL BUILDING WITH INTEGRATED HOT WATER HEATING SYSTEM

BACKGROUND OF THE INVENTION

This invention relates to metal buildings, particularly of the pre-engineered type comprising bolted together metal columns and beams with metal panels secured thereto. This type of building structure grew significantly in popularity during the 1950's and it possesses many advantages. For example, the building is relatively economical and may be constructed relatively quickly and easily with relatively unskilled labor. However, such buildings are relatively difficult to heat and maintain comfortably warm in cold climates.

Typical heating systems for metal buildings utilize the circulation of heated air, and in some instances, infra-red heaters are used. However, it is relatively costly to heat such buildings with either of these methods, since metal buildings are generally not well insulated and large heat losses through the walls and roof of the building are experienced, and moreover, when circulated hot air is used for heating buildings, large amounts of heat are lost through open doors and the like, and considerable time is required in order to bring the temperature of the building back to comfortable levels. Infra-red heaters, on the other hand, are relatively expensive to install and require relatively large amounts of energy to operate. Additionally, with conventional heating systems extensive ductwork or plumbing and the like must be provided in the building for circulation of hot air or hot water and the like to radiators or grids provided in the building. All of these factors contribute both to the initial cost of the building and to the cost of maintaining and operating the same.

The present invention provides a unique integrated heating system with the metal building structure, wherein separate heating ducts and the like are not required, and wherein relatively small, inexpensive and efficient heating units or boilers are sufficient to maintain the temperature in the building at a comfortable level. More particularly, in accordance with the present invention a unique integrated heating system is provided, wherein a relatively small hot water boiler is connected with suitable piping, including heating grids embedded in the floor of the building, and with the heating grids connected with the support columns and roof beams of the building, and wherein the columns and roof beams are constructed with hollow interiors for circulation of hot water therethrough, such that water heated by the boiler is circulated through the columns and beams and through the grids in the floor to heat the building primarily through radiant energy to thus obtain a substantially uniform temperature throughout the interior space of the building. Moreover, with the unique heating system provided by the invention, the structural steel members of the frame of the building and the concrete floor thereof are heated and water is used as the heat exchange medium. All of these elements retain heat for a period longer than air, and accordingly, once a desired temperature is obtained, the residual heat in these elements will maintain the temperature for an extended period of time. Accordingly, operation of the heater or boiler is required only at relatively infrequent intervals, as compared with prior art systems. A further advantage of this unique heating system is that open doors and the like do not affect temperature within the building as drastically as prior art systems utilizing circulated hot air. Moreover, the metal components of the building and the floor and the like are all warm, thus adding to the comfort of the interior of the building. Still further, the unique arrangement of components of the heating system of the invention enables different areas of the building to be heated to different temperatures, to thus obtain the most comfortable and efficient temperature relationships throughout the building. For example, in some areas a lower temperature may be required for comfort than in other areas of the building, and also, the northern portion of the building or that portion thereof exposed to the more severe weather conditions may require a greater temperature input than other portions of the building to maintain a substantially uniform and comfortable temperature level throughout the building.

In fact, in a building constructed in accordance with the present invention, a boiler or heater having a capacity normally used to heat a home having approximately 2,000 square feet of living space was utilized to effectively maintain a comfortable temperature in a metal building having approximately 31,000 square feet of floor space. Moreover, with this invention it was found that during even the coldest winter months the boiler or burner only operated for approximately 4 hours out of a 24 hour period, and yet maintained adequate temperature levels. The result with the building constructed in accordance with the present invention was a savings of approximately 70% in fuel costs, along with a greater degree of comfort in the building, and in fact, it is estimated that the savings realized by the heating system of the invention will actually pay for the cost of construction of the building in approximately 10 years.

OBJECTS OF THE INVENTION

Accordingly, it is an object of this invention to provide a unique building structure wherein the frame and floor of the building are utilized as a part of the radiant heat system for heating the interior of the building.

Another object of the invention is to provide a metal building construction having metal support columns and roof beams, and wherein the support columns and roof beams are constructed with hollow interiors for circulation of heated water therethrough to heat the interior of the building.

A still further object of the invention is to provide a metal building construction with an integrated hot water heating system, wherein the floor and frame of the building are used to conduct heated water, whereby the frame and floor are warmed and radiant energy therefrom is used to heat the interior of the building.

Yet another object of the invention is to provide a unique metal roof beam for supporting the roof of the building, wherein the beam has a hollow interior for circulation of hot water therethrough for use of the beam as a part of the heating system of the building.

A further object of the invention is to provide a unique metal support column for supporting the roof of the building, wherein the column has a hollow interior for circulation of hot water therethrough for use of the support column as a part of the heating system of the building.

A still further object of the invention is to provide a unique radiant heating grid for a hot water heating system integrated into the structure of a metal building, wherein the grid is embedded in the floor of the building and includes a supply manifold and discharge manifold, and a plurality of interconnected radiant heat pipes for conveyance of hot water therethrough to heat the interior of the building, and wherein the radiant heat pipes are connected to the supply and discharge manifolds by slip couplings, thus eliminating the necessity of separate fasteners and the like or of special engineering considerations during assembly of the building.

Yet a further object of the invention is to provide a metal building construction having an integrated heating system therein, wherein hot water is circulated through the frame of the building, including the columns and roof beams, and wherein orifice plates are provided in the columns and/or roof beams for enabling less restricted flow of hot water through the frame at locations more remote from the pump for circulating the hot water, so that a more uniform distribution of hot water through the frame is obtained without regard to the distance from the pump.

BRIEF DESCRIPTION OF THE DRAWINGS

FIG. 1 is a top perspective view of a metal building constructed in accordance with the invention.

FIG. 2 is a vertical sectional view of the building of FIG. 1 taken along line 2—2 in FIG. 1, and showing the basic frame and floor construction of the building.

FIG. 7 is a greatly enlarged view in section, with portions thereof broken away, of one of the heat radiating pipes and the supply and exhaust manifolds of a heating grid of the invention, and is taken along line 7—7 of FIG. 2.

FIG. 11 is a greatly enlarged, fragmentary, sectional view of a ridge beam or adaptor in accordance with the invention used to connect together adjacent upper ends of oppositely sloping roof beams, and is taken along line 11—11 in FIG. 1.

FIG. 12 is a fragmentary, perspective view of the ridge beam or adaptor of FIG. 11.

FIG. 13 is a view in section taken along line 13—13 of FIG. 11, and shows an orifice flow control plate used in the ridge beam of the invention.

FIG. 14 is a view taken along line 14—14 of FIG. 11, showing the upper end of a center column for supporting the ridge beam and roof of the building.

FIG. 15 is an enlarged, fragmentary, perspective view of a portion of the lower end of one of the center columns of the building and the foundation pier or footer on which the column is supported, and a portion of the piping system for the heating system of the invention.

FIG. 16 is a fragmentary view in section taken along line 16—16 of FIG. 15.

FIG. 17 is an enlarged, fragmentary, perspective view of the support plate and pipe couplings used in the structure of FIGS. 15 and 16 and cast in place when the concrete footer is formed.

DESCRIPTION OF THE PREFERRED EMBODIMENT

Figure 3:
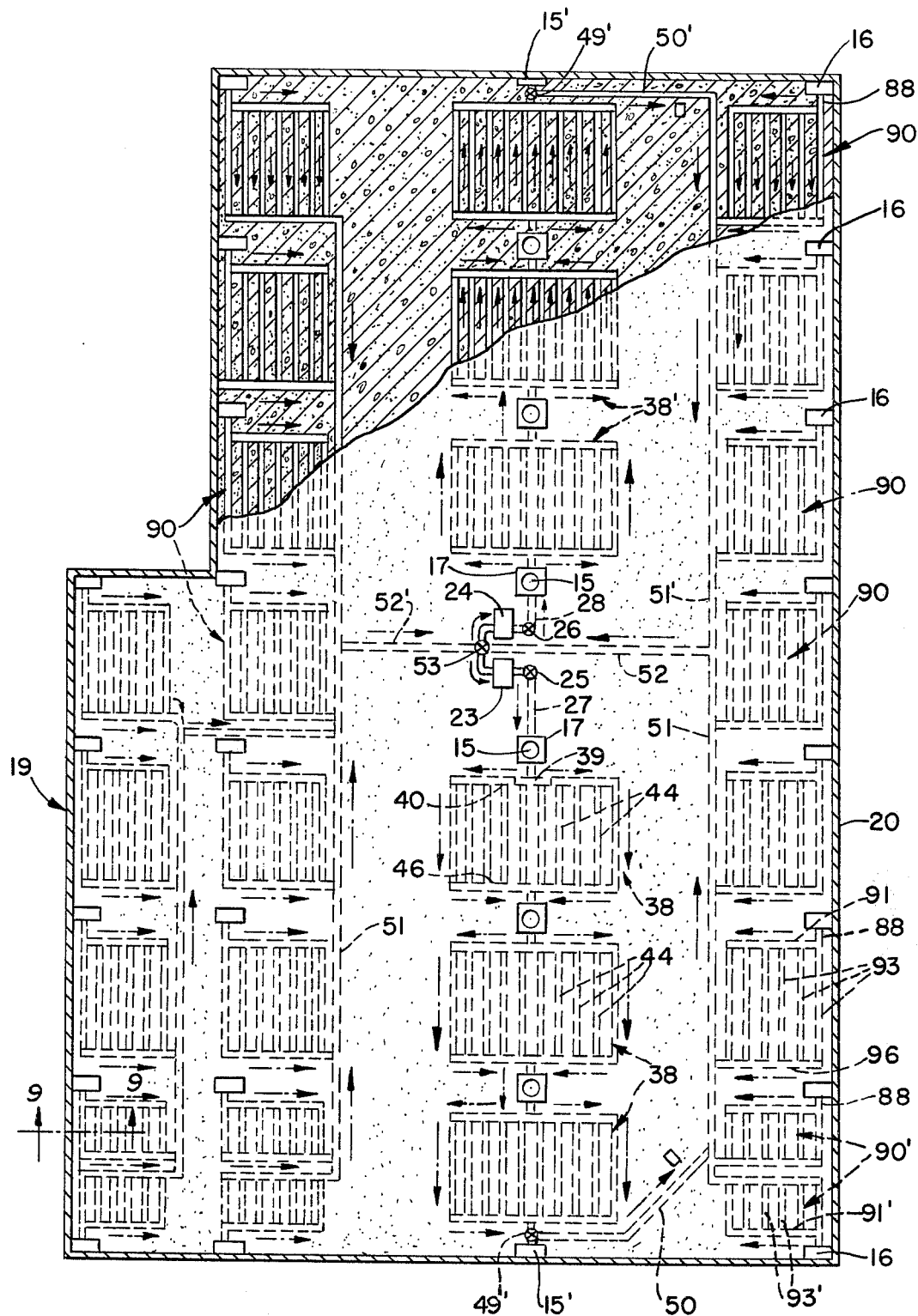
FIG. 3 is an enlarged plan view taken along line 3—3 of FIG. 2 of the piping and radiant heat grid systems used in the heating system of the invention.

In the drawings, wherein like reference numerals indicate like parts throughout the several views, a building in accordance with the present invention is indicated generally at 10 and comprises a concrete floor 11 and frame 12, including inclined tubular roof beams or rafter beams 13, ridge beams or adaptors 14, upright center columns 15 and upright haunch columns 16 at the sides of the building, and supporting the roof beams and adaptors or ridge beams. The columns 15 and 16 are supported at their lower ends on concrete footers 17 and 18, respectively. The building includes an extended portion 19 on one side thereof, including roof beams 13' and columns 16' supported on footers 18'. An extended floor portion 11' extends beneath the extended portion 19 of the building.

Suitable wall panels 20 and roof panels 21 of metal and the like are suitably secured to the frame in a conventional manner to enclose the building, and a layer of sprayed on fiber insulation 22 is applied to the interior surface of the building to insulate the walls and roof thereof and prevent excessive heat transfer therethrough. If desired, and in the preferred embodiment, the insulation is applied to varying thicknesses, so as to obtain a substantially uniform heat loss or insulation factor throughout the height of the building.

Figure 4:
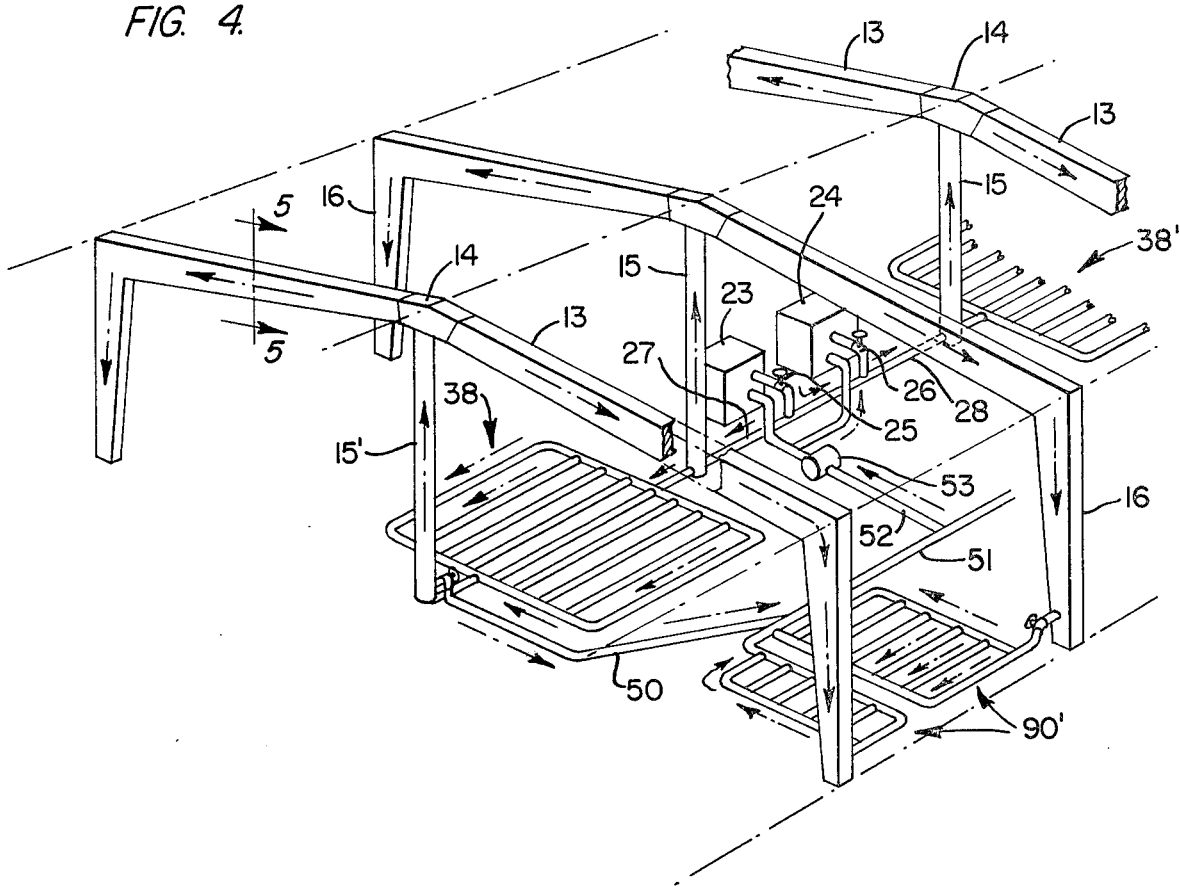
FIG. 4 is a somewhat schematic, perspective view of the frame and hot water circulating system of the heating system of the invention, showing the various control valves, heat grids and boiler and the like therefor.

The overall heating system for the building is seen best in FIGS. 3 and 4. The heating system of the invention is integrated into the structure of the building, and utilizes hot water as the heat exchange medium. The water is heated in a pair of boilers 23 and 24 of any suitable conventional type, as, for example, gas fired or electrically heated and the like, and in a preferred embodiment, each boiler has a capacity and is of the type sufficient to normally heat a house having about 2,000 square feet of living space. One of the boilers in the building of the invention serves as a backup for the other boiler, whereby in the event of failure of one of the boilers, freezing of the building can be prevented by using the backup boiler. The boilers are connected through suitable valves 25 and 26 for controlling flow from the boilers, with supply pipes 27 and 28 joined to adjacent center columns 15 for flow of hot water from one or the other or both of the boilers through the pipes 27 and 28 to the columns 15. The columns are hollow, and in a preferred embodiment, comprise 6 inch structural steel pipe. The connection of the supply pipes 27 and 28 with the columns 15 is identical and details of the connection of pipe 27 with column 15 are shown in FIG. 16.

During construction of the footer 17, a bearing pad and pipe connection assembly 29 is supported at the upper end of the form for the footer 17, and the assembly includes a rectangularly shaped metal bearing pad 30 having an orifice or opening 31 through the center thereof, and a plurality of anchor bolts 32 secured thereto and depending therefrom. Cross braces or ties 33 are welded or otherwise suitably secured to the lower ends of the anchor bolts 32 for forming a secure anchor with the concrete in the footer 17 when the concrete is cured. Also, a 3 inch standard T 34 is welded to the underside of the bearing pad 30 and the supply pipe 27 is threadably joined thereto. An outlet pipe 35 is threadably connected to the other end of T 34 and extends outwardly of the footer 17 on the side thereof opposite supply pipe 27 for continuing the flow of hot water beyond column 15. The column 15 has a bearing plate 36 welded or otherwise suitably affixed to the bottom end thereof, and a sealing gasket 37 of a rubber asbestos material or the like, preferably reinforced with a wire mesh, is sandwiched between the plates 30 and 36.

As seen in FIG. 16, the upper surface of bearing pad 30 is disposed substantially flush with the upper surface of the footer 17.

The pipe 35, after exiting from the first footer 17, is connected with a heating grid 38 embedded in the floor 11 and comprising a T fitting 39 having oppositely extending supply header pipes 40 and 41 secured thereto. Each of the supply header pipes has a plurality of laterally extending, relatively short slip connectors or nipples 42 welded or otherwise suitably affixed thereto in substantially equally spaced apart relationship. An O-ring 43 is fitted around each of the nipples 42 and a heat grid tube 44 is slipped over each of the nipples in telescoped, snug fitting, sealed relationship thereto. The other ends of the heat grid tubes 44 are similarly sealingly received over nipples 45 welded to and projecting from oppositely extending manifold pipes 46 and 47 projecting from opposite sides of a T fitting 48, which is connected with an assembly 29 in a subsequent footer 17 beneath the next adjacent column 15. Accordingly, hot water leaving the grid 38 enters the assembly 29 in footer 17 and a portion thereof flows upwardly through column 15, while the remainder thereof flow outwardly into a subsequent grid 38 between the next adjacent pair of columns. The flow continues accordingly through subsequent grids 38 and upwardly through columns 15 to the endmost column 15' at the end of the building. A bypass valve 49 is in the pipe between the last grid 38 and last or endmost column 15', and a bypass pipe 50 is connected therewith and extends to a return pipe 51, whereby upon manipulation of the valve 49, the flow of hot water exiting the last grid 38 is diverted through bypass pipe 50 and to the return pipe 51 and thence back through pipe 52 to a pump 53, which is in turn, connected with boilers 23 and 24 for effecting circulation of the water in the heating system.

A substantially identical arrangement is provided at the other end of the building, wherein a plurality of heating grids 38' are provided between adjacent columns 15 and a bypass pipe 50' is connected with a return pipe 51' for returning water from the grid directly to the pump 53 and boiler or boilers 23 and 24.

The upper ends of the columns 15 each has a bolt flange 53 welded or otherwise suitable secured thereto, and the flanges 53 on the columns 15 are bolted to the opposite side edge portions 54 and 55 of the bottom wall 56 of the ridge beams or adaptors 14. A pair of openings 57 are formed through the bottom wall 56 in communication with the hollow interior of the column 15 for flow of water upwardly from the column into the hollow interior of the adaptor or ridge beam 14.

As seen best in FIGS. 11, 12 and 13, the ridge beam or adaptor comprises the bottom wall 56 and a pair of substantially parallel, spaced apart side walls 58 and 59. A top wall 60 is welded to the upper edges of side walls 58 and 59 and has oppositely downwardly sloping sides of the desired pitch for the pitch of the roof in the assembled building.

A pair of flow control orifice plates 61 and 62 are secured in the space between side walls 58 and 59 on opposite sides of the openings 57 for controlling flow outwardly to opposite ends of the ridge beam 14.

A gasket 63, similar to gasket 37, is interposed between the upper end of column 15 and the bottom wall 56 of ridge beam or adaptor 14. Opposite ends of ridge beam 14 are closed by bolt plates 64 and 65 having openings 66 and 67 therethrough for flow of water outwardly from the ridge beam 14 into the roof beams or rafter beams 13.

Figure 5:
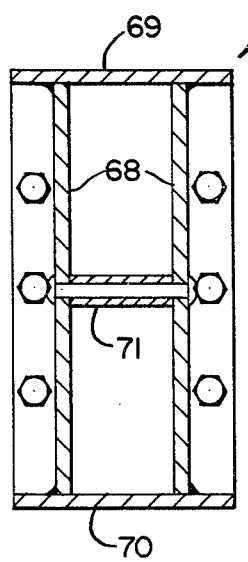
FIG. 5 is a greatly enlarged, sectional view of a roof beam and is taken along line 5—5 of FIG. 4.
Figure 6:
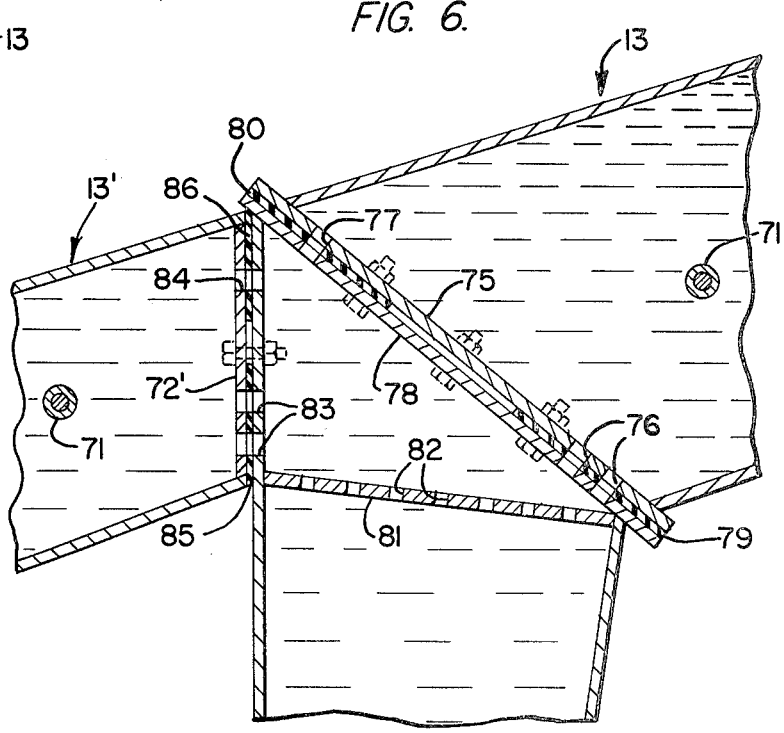
FIG. 6 is a greatly enlarged, vertical, longitudinal, sectional view of a fragment of the frame of the building of the invention, showing the connection of a roof beam with the upper end of a column.
Figure 8:
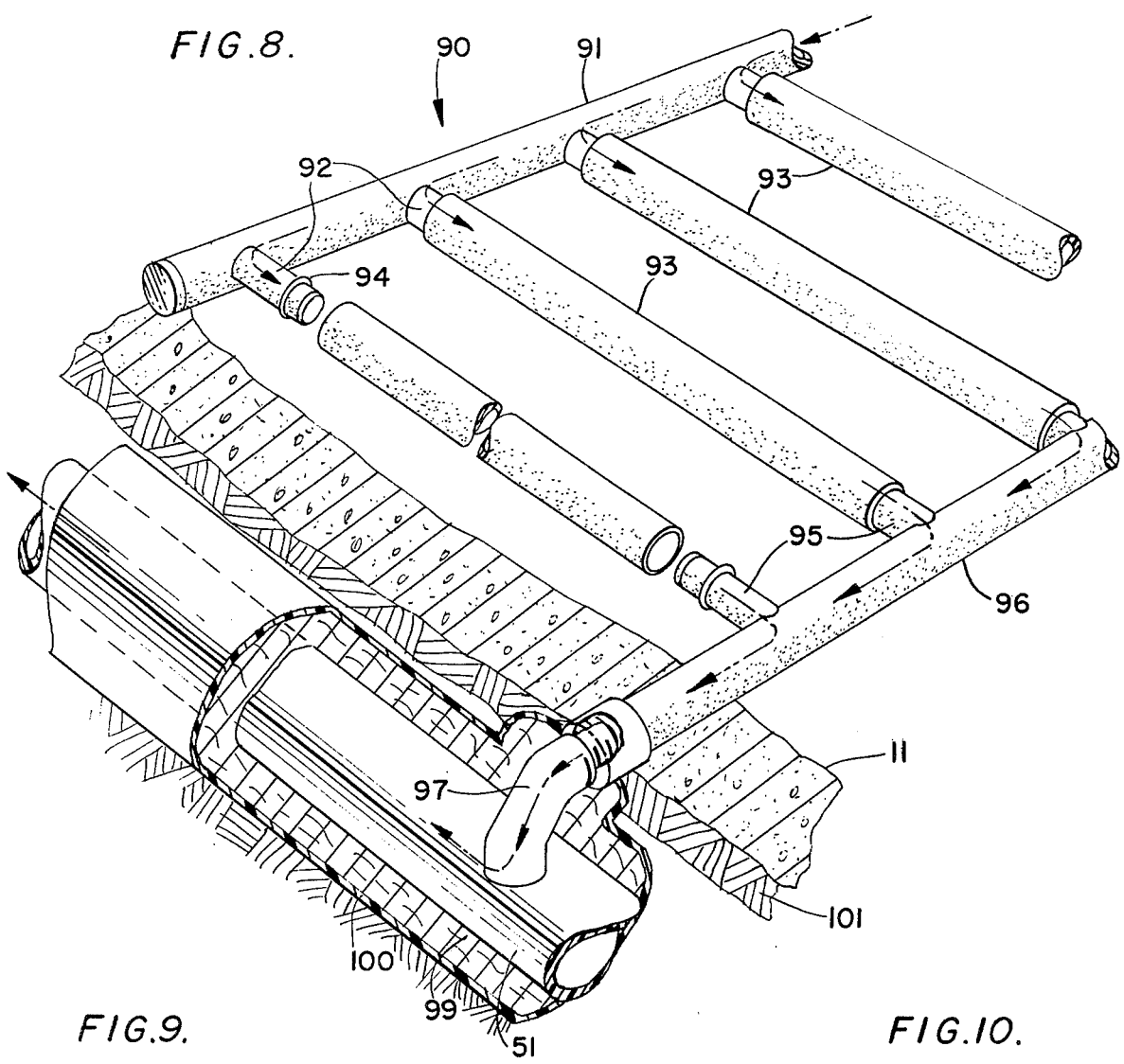
FIG. 8 is a fragmentary, perspective view, with portions broken away, of one of the return pipes and radiant heating grids of the heating system of the invention.
Figure 9:
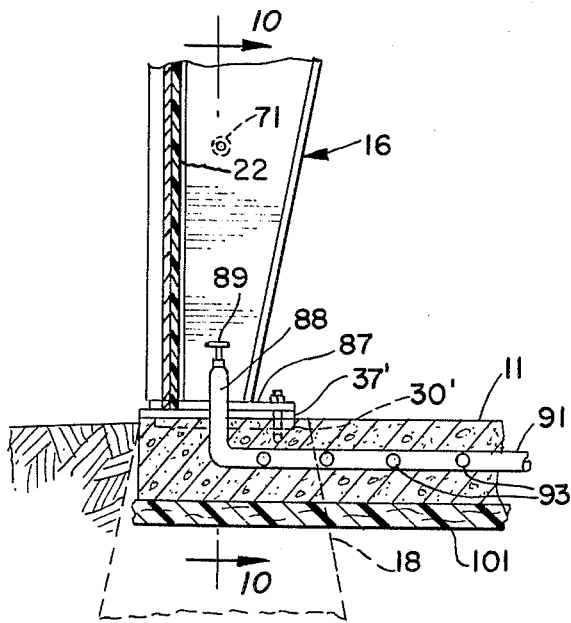
FIG. 9 is an enlarged, fragmentary, sectional view, taken along line 9—9 of FIG. 3, of the connection of one of the wall columns of the invention with the floor of the building.
Figure 10:
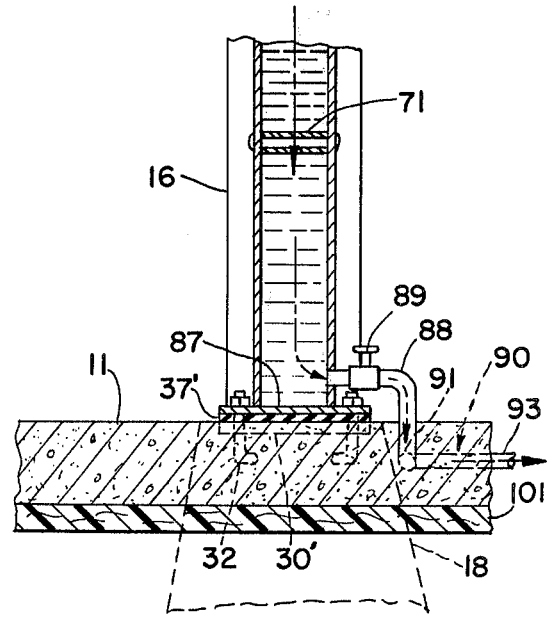
FIG. 10 is a view taken along line 10—10 in FIG. 9.

As seen in FIG. 5, the rafter beams 13 each comprises a pair of substantially parallel, elongate, spaced apart side walls 68 having top and bottom walls 69 and 70 welded thereto. The side walls 68 are maintained in predetermined spaced apart relationship during assembly by means of spacers 71 secured between the side walls 68. The upper ends of the beams 13 have bolt flanges 72 welded thereto, with openings 73 therethrough in registry with the openings 66 and 67, respectively, at the respective end of the ridge beam 14, and sealing gaskets 74 are sandwiched between the end plates or flanges 64 and 65 of the ridge beam 14 and the end plates 72 of the rafter beams 13. The lower ends of the rafter beams 13 are closed by angularly disposed plates 75 having a pair of spaced openings 76 therethrough near the lower end thereof for flow of water from the rafter beam 13 into a haunch column 16, and an opening 77 through an upper end portion thereof for flow of air therethrough to prevent an airlock from forming in the beams and columns. The upper end of the haunch column 16 is similarly closed by a similar plate 78 having openings therethrough aligned with openings 76 and 77 and sealed relative thereto by means of gaskets 79 and 80 interposed between the plates 75 and 78. An orifice plate 81 is secured in the upper end portion of each haunch column 16, and the orifice plates have a plurality of openings or orifices 82 formed therethrough, with the orifices being of a larger size as the distance of the haunch column from the pump increases, so that a substantially uniform flow is obtained throughout the system, regardless of the distance from the circulating pump.

The outer upper end portion of the haunch columns 16 in the area adjacent the building extension 19 have openings 83 and 84 in registry with like openings in an adjacent end of the rafter beams or roof beams 13' of the extension for flow of water from haunch column 16 into the extended or extension rafter beams 13'. The openings 83 and 84 are suitably sealed by means of gaskets 85 and 86 sandwiched between the haunch column 16 and adjacent end of rafter beam 13'. The lower ends of the haunch column 16 have plates 87 secured thereto as by welding or the like, and the plates 87 are supported on and secured to anchor plates or support pads 30' cast into the upper end portion or surface of footers or piers 18, similarly to the arrangement at the center columns 15. However, rather than the T fitting 34, as used with the center columns, a pipe 88 extends out from the side of the lower end portion of haunch column 16 and has a valve 89 therein for controlling flow therethrough.

Each heating grid 90 comprises a supply header 91 to which the pipe 88 is connected for supplying hot water thereto.

A plurality of laterally extending pipe stubs or nipples 92 are welded along one side of the supply header 91 on approximately 15 inch centers, and a plurality of heat grid tubes 93 are slidably and sealably received over the pipe stubs 92 and are sealed thereto by means of O-rings or the like 94. The heat grid tubes 93 in one embodiment of the invention comprise 1 inch diameter furniture tubes having the ends thereof slightly flared and smooth on their inner surfaces for a tight sliding engagement with the pipe stubs and O-rings. The heat grid tubes 93 are connected at their other ends with a plurality of pipe stubs or nipples 95 welded along one side of an exhaust manifold 96, which in turn, is threadably connected with an elbow 97, which in turn, is joined with the return pipe 51.

The pipes 91, 93 and 96 are all preferably coated with a high temperature epoxy paint 98 to protect them from the corrosive effect of the concrete as it sets up, and also to prevent electrolysis after the concrete cures. The return pipe 51 and elbow 97 are preferably made of PVC plastic and are wrapped or covered with an approximately 4 inch thick layer of insulation 99, such as Zonolite or the like, and the insulation is wrapped with a layer of plastic 100 to hold the insulation in place.

A layer of insulation 101 is also provided beneath the floor of the building.

A typical building constructed in accordance with the invention may be about 200 feet long and 120 feet wide and have an extension or office area 19 on the side thereof about 30 feet wide and 114 feet long, with an overhead concrete storage area. Further, except for the section in the center of the building where the boilers are located, each heat grid 38 and 38' is approximately 30 feet wide and 20 feet long between each pair of center columns, and the heat grids 90 between the haunch columns are approximately 15 feet wide and 20 feet long. Therefore, approximately 40% of the floor area is heated. Additionally, the heated water is discharged from the boilers into the pipes after approximately a 40° to 80° temperature rise. The inlet temperature of the water going into the boilers at the beginning of boiler operation is about 70° to 75°, and the temperature is raised approximately 40° at a flow rate of about 80 gallons per minute. The water in the entire structure of the building will begin to rise until the inlet water temperature into the boilers is about 100°. At this temperature, the outlet temperature of water entering the pipes will be about 140°, and the building will then have reached a temperature sufficient to operate the thermostat and turn off the boilers. The entire building structure, including the concrete floor, steel frame and water, will then tend to equalize in temperature, and the overall temperature will gradually drop until the temperature below the thermostat setting is reached, at which time the boilers and pump will again begin to operate. The boilers and pump motor are connected together electrically to the thermostat, so that any time the boilers come on, the pump comes on. If the pump does not come on for some reason, the boilers will shut down, and if this fails to function properly, then a temperature responsive switch connected with the boilers will shut down the boilers at a maximum water temperature of about 200° F.

The insulation and plastic surrounding the PVC return pipe not only prevents heat loss from the pipe into the ground, but also allows for relatively unimpeded movement or slippage between the pipe and the ground to enable the pipe to expand and contract with thermal changes.

The valve 89 at the base of each haunch column in the pipe 88 leading to each heat grid 90 enables the flow of hot water to the respective grids to be cut off, so that any of the heat grids 90 in the floor may be rendered inoperative as desired to control the temperature in various areas throughout the building. Further, the valves 49 at the end columns 15' in the center of the building enable the flow of hot water to be bypassed through pipes 50 to the return lines 51 and 51' and thence back to the pump and boilers without circulation of the water through the endmost columns and roof beams and heat grids in the floor at the sides of the building. If desired, a bypass pipe 50 and bypass valve 49 may be provided at the outlet of each of the center heat grids 38 to divert flow from the grids immediately to return lines 51 and 51' without flow upwardly through the center columns 15 and thence downwardly through the roof beams or rafter beams to the haunch columns and heat grids 90 at the sides of the building.

With a building constructed in accordance with the invention, there is only a 1° or 2° differential in temperature between a point 1 foot above the floor and a point 1 foot below the ceiling. Moreover, because of the fact that the floor and ceiling and walls of the building are all warm and radiant energy is used to heat the building, a temperature of about 65° can be maintained and persons within the building will stay quite comfortable.

Further, one of the boilers serves as a backup for the other to prevent freezing of the building in the event one of the boilers should fail for any reason.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A building with an integrated heating system, comprising: a building having a floor and a frame including upright, tubular, fluid-conveying columns supported on the floor and sloping, tubular, fluid-conveying roof beams supported on and in fluid communication with the columns, the columns being hollow and fluid tight so that heat exchange fluid can be circulated throughout said building frame; a plurality of heating grid means in the floor, said heating grid means each including a plurality of pipes connected to receive fluid from the columns, selected one of said columns having valves therein for controlling flow of fluid therethrough so that heating grid means fluidly connected to said selected columns can be individually controlled; heater means connected to heat the fluid; and fluid circulating means connected to circulate the fluid through the heater means, the columns and roof beams and the heating grid means to heat the building to a substantially uniform temperature throughout.

2. A building as in claim 1, wherein the columns and roof beams comprise metal, the floor is concrete, and the heat exchange fluid is water.

3. A building as in claim 2, wherein there are a plurality of spaced apart center columns spaced along the center of the building and a plurality of spaced apart haunch columns spaced along the sides of the building, with pairs of haunch columns and a center column being aligned transversely of the longitudinal dimension of the building, and a pair of roof beams each supported at one end of the haunch columns and supported at their other ends on the center columns, said roof beams sloping upwardly from the haunch columns to the center column and connected in fluid-flow communicating relationship with one another.

4. A building as in claim 3, wherein a heating grid means is in the floor between adjacent pairs of haunch columns, said heating grid means being connected in fluid-flow communicating relationship with the lower ends of the haunch columns.

5. A building as in claim 4, wherein a heating grid means is in the floor between adjacent pairs of center columns, said heating grid means being connected in fluid-flow communicating relationship with the lower ends of the center columns.

6. A building as in claim 5, wherein a return pipe is connected in common with the heating grid means at the sides of the building between adjacent haunch columns, said return pipe being connected with said fluid circulating means.

7. A building as in claim 6, wherein a bypass return pipe is connected between the heating grid means at the center of the building and the endmost center column at each end of the building, and with the return pipe connected with the heating grid means at the sides of the building, and valve means in said return bypass pipe for bypassing flow from the center heating grid means to the bypass return pipe and to the return pipe and thence back to the fluid circulating means.

8. A building as in claim 7, wherein the fluid circulating means is positioned substantially centrally of the building and the center heating grid means and center columns extend from the fluid circulating means toward opposite ends of the building and are connected to receive flow simultaneously from the fluid circulating means.

9. A building as in claim 8, wherein said selected columns are said haunch columns and said valve of each haunch column is connected between the lower end of said each haunch column and the heating grid means adjacent thereto for controlling flow of heating fluid from the haunch column into the associated heating grid means, whereby the heating grid means at the sides of the building may be individually controlled.

10. A building as in claim 9, wherein the heater means comprises a pair of boilers connected in parallel with the fluid circulating means and having valve means connected therewith for selective flow of the fluid through a selected one of the boilers to heat the fluid.

11. A building as in claim 10, wherein the heating grid means each comprises an elongate fluid supply header having a plurality of spaced apart, laterally projecting nipples thereon in fluid-flow communicating relationship therewith, a fluid exhaust manifold having a plurality of spaced apart, laterally projecting nipples thereon in fluid-flow communicating relationship therewith, and a plurality of heat grid tubes connected with the nipples on the header and manifold, respectively, and extending therebetween for conveying fluid from the header to the manifold.

12. A building as in claim 11, wherein the connection between the grid heat tubes and the nipples on the supply header and exhaust manifold comprises a slip connection, and seal means engaged between the nipples and grid heat tubes sealing the connection therebetween.

13. A building as in claim 12, wherein the heating grid means and pipes connected therewith in the floor of the building are all coated with a corrosion resisting material to prevent corrosion of the pipes comprising the heating grid means and fluid circulating system.

14. A building as in claim 13, wherein the fluid return pipe comprises a plastic material, insulation surrounding said plastic return pipe, and a plastic sleeve surrounding said insulation, said plastic return pipe being buried in the ground beneath the floor of the building, and said plastic sleeve permitting relative movement between the return pipe and ground upon thermal expansion and contraction of the pipe.

15. A building as in claim 14, wherein an adaptor beam is supported on the upper end of each of the center columns and adjacent ends of said roof beams are connected with said adaptor beams, said adaptor beams connected in fluid-flow communicating relationship with the center columns and roof beams.

16. A building as in claim 15, wherein flow control orifice plates are in one of said haunch columns, center columns, roof beams and adaptor beams, said orifice plates having larger orifices therethrough as the distance of the plates from the fluid circulating means increases, whereby substantially uniform flow of fluid is obtained throughout the building, regardless of the distance from the fluid circulating means.

17. A building as in claim 16, wherein the building comprises a pre-engineered metal building having metal wall and roof panels secured to the haunch columns and roof beams enclosing the building, and insulation applied to the inner surface of the wall and roof panels to thermally insulate the building, said insulation having varying thickness at various portions of the building to provide a uniform insulation factor throughout the building.

18. A building as in claim 17, wherein the lower ends of said center columns and haunch columns are supported on concrete footers cast in the floor of the building, and pipe connecting adaptor assemblies cast in place in the footers beneath the center columns for establishing fluid-flow communicating relationship between the center columns and the center heat grid means.

19. A building as in claim 18, wherein the haunch columns and roof beams comprise steel and include spaced top, bottom and side walls welded together to define a space therebetween for conveying fluid, plates closing the opposite ends of the haunch columns and roof beams, said plates having openings therethrough for flow of fluid, and gaskets interposed between adjacent ends of adjacent columns and beams for effecting a fluid-tight seal thereat.

20. A building as in claim 19, wherein said center columns, said adaptor beams, said roof beams, said haunch columns and said heating grid means at the sides and center of the building and the boilers and fluid circulating means are all connected for effecting flow from the fluid circulating means outwardly down the center of the building toward opposite ends thereof and upwardly through the center columns and horizontally through the center heating grid means in parallel flow relationship and thence downwardly through the roof beams to the haunch columns and downwardly through the haunch columns and through the heating grid means at the sides of the building and to the return pipe and thence back to the fluid circulating means and boilers.

21. A building as in claim 20, wherein the center columns comprise structural steel pipe.

22. A building as in claim 21, wherein the heating grid tubes connected between the supply header and exhaust manifold comprise one inch diameter furniture tubes.

23. A building as in claim 22, wherein the heating grid tubes are coated with a high temperature epoxy paint to prevent corrosion of the tubes by the concrete while the concrete is setting and to prevent electrolytic action on the tubes after the concrete has cured.

24. A building as in claim 23, wherein the return pipe comprises polyvinyl chloride plastic.

25. A building as in claim 24, wherein a layer of insulation is provided under the floor of the building to insulate the building from the ground.

26. A building as in claim 1, wherein a plurality of heating grid means are in the floor, a return pipe connected in common with all of the heating grid means and with the fluid circulating means.

27. A building as in claim 1, wherein the fluid circulating means is positioned substantially centrally of the building and the center heating grid means and center columns extend from the fluid circulating means toward opposite ends of the building and are connected to receive flow simultaneously from the fluid circulating means.

28. A building as in claim 1, wherein valve means is connected between the lower end of each haunch column and the heating grid means adjacent thereto for controlling flow of heating fluid from the haunch column into the associated heating grid means, whereby the heating grid means at the sides of the building may be individually controlled.

29. A building as in claim 1, wherein the heater means comprises a pair of boilers connected in parallel with the fluid circulating means and having valve means connected therewith for selective flow of the fluid through a selected one of the boilers to heat the fluid.

30. A building as in claim 1, wherein the heating grid means each comprises an elongate fluid supply header having a plurality of spaced apart, laterally projecting nipples thereon in fluid-flow communicating relationship therewith, a fluid exhaust manifold having a plurality of spaced apart, laterally projecting nipples thereon in fluid-flow communicating relationship therewith, and a plurality of heat grid tubes connected with the nipples on the header and manifold, respectively, and extending therebetween for conveying fluid from the header to the manifold.

31. A building as in claim 1, wherein the heating grid means and pipes connected therewith in the floor of the building are all coated with a corrosion resisting material to prevent corrosion of the pipes comprising the heating grid means and fluid circulating system.

32. A building as in claim 3, wherein an adaptor beam is supported on the upper end of each of the center columns and adjacent ends of said roof beams are connected with said adaptor beams, said adaptor beams connected in fluid-flow communicating relationship with the center columns and roof beams.

33. A building as in claim 27, wherein flow control orifice means is in said columns, said orifice means having larger orifices as the distance from the fluid circulating means increases, whereby substantially uniform flow of fluid is obtained throughout the building, regardless of the distance from the fluid circulating means.

34. A building as in claim 3, wherein the building comprises a pre-engineered metal building having metal wall and roof panels secured to the haunch columns and roof beams enclosing the building, and insulation applied to the outer surface of the wall and roof panels to thermally insulate the building, said insulation having varying thickness at various portions of the building to provide a uniform insulation factor throughout the building.

* * * * *